E. F. BURNS.
HEAT REGULATOR FOR BAKING PANS.
APPLICATION FILED MAY 10, 1915.
1,202,796.
Patented Oct. 31, 1916.
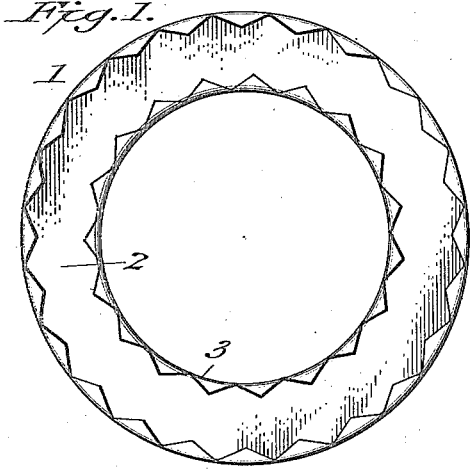
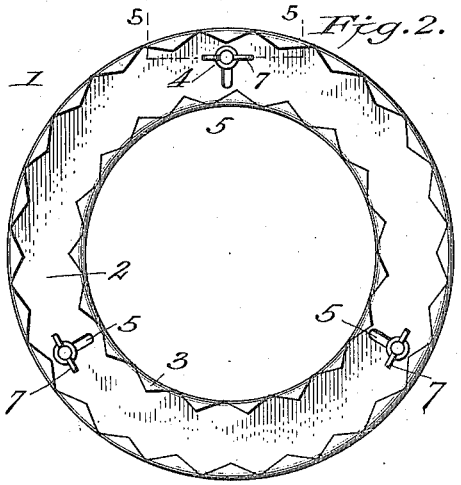
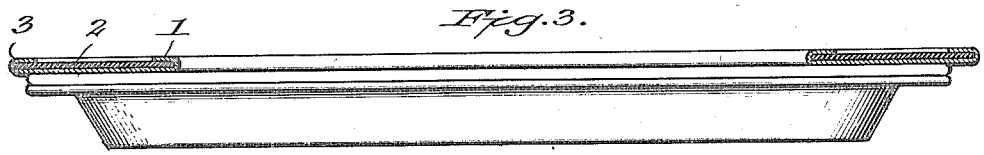
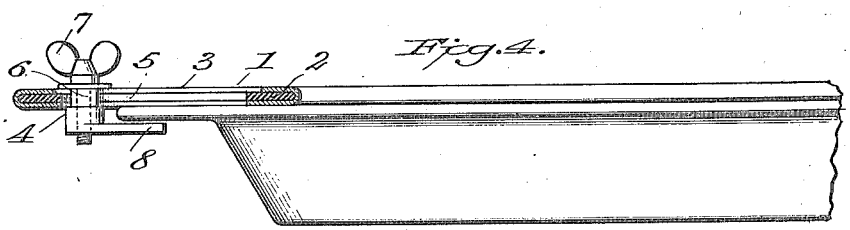
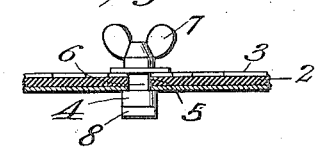
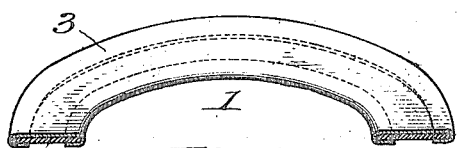
Witnesses:
G. Sargent Elliott
Adella M. Fowle
Inventor:
Eudora F. Burns
By H. S. Bailey Attorney.

UNITED STATES PATENT OFFICE.

EUDORA F. BURNS, OF DENVER, COLORADO.

HEAT-REGULATOR FOR BAKING-PANS.

1,202,796.　　　　　Specification of Letters Patent.　　Patented Oct. 31, 1916.

Application filed May 10, 1915. Serial No. 27,189.

*To all whom it may concern:*

Be it known that I, EUDORA F. BURNS, a citizen of the United States of America, residing in the city and county of Denver and State of Colorado, have invented a new and useful Heat-Regulator for Baking-Pans, of which the following is a specification.

My invention relates to a new device for regulating the application of the baking heat of ovens to the baking of pies, cakes, puddings, and other foods of like character; and the objects of my invention are, first, to provide a heat regulating ring that can be placed over pies, puddings, and other articles of food while they are being baked in plates, pans and other dishes, and that will prevent said pies or puddings or other articles of food from cooking faster and becoming too well done around their outer edges, before the central portion of said pie or pudding or other articles of food is cooked. And second, to provide a pie or pudding baking regulator that can be applied to the tops of baking pies and puddings to cover their peripheral edges when desired to prevent that portion of them from cooking faster than their central portions. I attain these objects by the mechanism illustrated in the accompanying drawings, in which:

Figure 1, is a plan view of the improved heat regulating ring. Fig. 2, is a similar view showing the ring provided with clamps by which it may be secured to the circumferential edge of a pan. Fig. 3, is an edge view showing the application of the ring to an ordinary pie plate, the ring being shown in section. Fig. 4, is an enlarged view of a portion of a pie plate, showing the application thereto of the ring provided with the clamps shown in Fig. 2, the ring being in section. Fig. 5, is a transverse sectional view on the line 5—5 of Fig. 2. And Fig. 6, is a sectional perspective view of the ring showing the under side thereof.

Similar letters of reference refer to similar parts throughout the several views.

In the present state of the art of baking some articles of food and pastry, especially pies, puddings and similar foods in plates, pans, and dishes, as they are commonly made and used for baking these articles in, it is the rule that they bake much faster around the circumferential edges of the plates, pans and dishes than in their centers or central portions and that they are very unevenly cooked on this account. Thus when the central portion is done or cooked as it should be, the circumferential edge portion of the pie or pudding or other article of food for a marginal distance around the plate or dish, is over-done.

The essential object of my invention is to provide a device that can be placed on plates or dishes containing pies or pudding and other articles of food, and be adjusted to regulate the heat that comes in contact with the circumferential edge portion of the plates and dishes of baking pies and other articles of food.

To this end my invention consists of the following instrumentalities, reference being had to the accompanying drawings:

The numeral 1 designates a flat ring which may be made of any suitable material, but which is preferably made of two different parts and materials, although more parts and materials may be used if desired. These two different parts and materials consist of a heat retaining core or center portion 2, which I preferably make of asbestos, although if desired other materials or combinations of materials may be used. I then strengthen and support and protect this core portion by a covering 3, preferably of metal, although any other suitable material may be used if desired. I preferably use a supporting covering for the asbestos, made of tin, and preferably arrange it to cover wholly one side and the outer edge portion of the other, but if desired both sides can be either wholly or only partially covered with metal. The food being baked frequently sticks to the ring, and for this reason the tin covering is preferably used, as it is readily cleansed, the tin being placed next to the edge of the plate or pan. Consequently it is essential that tin or some other metal be used as a covering for either one or both sides of the core, for the reason that should the disk be made wholly of asbestos or some other material, food when it rises will stick to it and the disk would be much more difficult to clean. The tin also acts to stiffen the asbestos core, which would otherwise be easily bent out of its flat form or broken.

My improved ring is adapted to set on pie baking plates, pudding baking pans, and baking plates, pans and dishes for baking numerous articles of food in stoves and range ovens. It consequently is made in different sizes, and it may be made of any desired shape. For some plates and pans it is made round and in the form of a thin ring. It is adapted to be placed on top of whatever dish it is to be used on, to prevent over-baking along the edge portion of the pie, pudding or other article of food before the center of the pie, pudding or other article of food is evenly and satisfactorily baked at its center or central portion. For use on a pie plate, it is made of a diameter to fully cover and preferably to lap over the edge of the plate all around when placed centrally over the plate, and to cover from one to two inches of the edge of said plate.

In Figs. 2, 4, and 5 I illustrate my improved baking heat regulating ring provided with adjustable plate, pan and dish engaging clips 4, which enable the ring to be set where desired on a plate either centrally over it or eccentrically over it in any desired part of it without danger of accidental displacement from the position it was set in by moving about in an oven other plates or pans containing cooking matter. The clips are attached to slots 5 formed radially in the flat ring at equal distances apart. Three of these slots are illustrated but more may be used if desired. The clips comprise a sliding block portion having a rectangular portion 6 that fits in the slot, and a butterfly thumb screw 7 that threads into a threaded aperture that is formed through the tongue and block; the thumb screw being provided with a shouldered portion that rests on the top surface of the disk, and thus when screwed into the tongue clamps the block to the disk. The blocks are provided with a lug portion 8, which is spaced far enough below the bottom of the disk to extend under the peripheral edge of a plate or pan or disk, and thus lock the disk to the dish, so that it will be securely fastened to it, and the plate or other dish with its contents can be lifted by the ring. My improved disk also prevents the intense heat from glazing the food to the edges of the pans or dishes used, thus enabling them to be much more readily cleaned and washed.

While I have illustrated a preferred construction of sliding clip, any suitable form of clip that can be used on the ring to secure it on dishes in adjusted positions against accidental displacement can be used.

The operation is as follows: When baking say for instance a pie, after it has been in the oven long enough to be partially baked, and it is found that the circumferential edge of the pie is baking faster than its central portion, the disk is placed centrally over the pie plate and pie, and the disk will reduce the heat against the part of the pie covered by it and allow the open central portion of the pie to cook enough faster than the rim portion with the disk on it, so that by proper watching the pie will be cooked evenly throughout its entire surface. The asbestos core of the disk acts as a heat absorber and retainer that slowly reflects and distributes the heat it absorbs, while the metal covering protects and strengthens the asbestos core against being easily broken. My invention provides a simple and inexpensive device for regulating and distributing the baking heat over the surface of pies, puddings, and other foods while baking.

Having described my invention what I claim as new and desire to secure by Letters Patent, is:

1. A heat regulating device for pie and other cooking plates, consisting of an integral one-piece asbestos ring covered wholly on one side with a thin metal strip which is bent over and around both edges of the asbestos ring, thus leaving an annular exposed portion of the asbestos between the edges of the metal on one side of the ring.

2. A heat regulating device for pie and other cooking plates, consisting of an integral one-piece asbestos ring covered wholly on one side with a thin metal strip which is bent over and around both edges of the asbestos ring, thus leaving an annular exposed portion of the asbestos between the edges of the metal on one side of the ring, said heat regulating ring having its inner and outer edges crimped, said device being adapted to lie flat against the edges of said plate.

3. In a heat regulating device for pie and other cooking plates, the combination of a one-piece asbestos ring adapted to cover the edge portion of plates, and a portion of the area of the plate adjacent to its peripheral edge, and a one-piece metal covering strip arranged to cover one whole side of said asbestos ring and to cover its inner and outer edges, thus leaving an annular portion of one side of the asbestos ring exposed, radial slots through the metal and asbestos rings, a butterfly bolt slidably mounted in each slot and extending through the same, a nut threaded to the end of said butterfly bolt, and a clamping lug on said nut offset a sufficient distance from the ring engaging end of the nut to clamp the rim of the plate between the said lug and the ring, whereby the asbestos ring is clamped to the top side of the pie plate.

In testimony whereof I affix my signature in presence of two witnesses.

EUDORA F. BURNS.

Witnesses:
EDITH BURNS LANESBREY,
IDA BURNS PATZOLD.